United States Patent [19]
Meynier

[11] Patent Number: 5,810,080
[45] Date of Patent: Sep. 22, 1998

[54] DEVICE FOR EXPLORING AN UNDERGROUND FORMATION CROSSED BY A HORIZONTAL WELL COMPRISING SEVERAL ANCHORABLE SONDES

[75] Inventor: Patrick Meynier, Chatou, France

[73] Assignee: Institut Francais du Petrole, Rueil-Malmaison, France

[21] Appl. No.: 745,054

[22] Filed: Nov. 7, 1996

[30] Foreign Application Priority Data

Nov. 10, 1995 [FR] France .................... 95/13447

[51] Int. Cl.$^6$ .............. E21B 49/00; G01V 1/40
[52] U.S. Cl. .......... 166/66; 73/152.17; 166/250.11; 181/102; 181/106
[58] Field of Search .......... 166/66, 50, 250.11, 166/250.16, 254.1; 73/152.02, 152.17, 152.58; 367/86, 911; 181/101–106

[56] References Cited

U.S. PATENT DOCUMENTS

| | | | |
|---|---|---|---|
| 4,428,422 | 1/1984 | Laurent | 166/212 |
| 4,664,289 | 5/1987 | Shimizu et al. | 221/2 |
| 4,855,732 | 8/1989 | Cretin et al. | 340/856 |
| 4,862,425 | 8/1989 | Cretin et al. | 367/33 |
| 4,874,060 | 10/1989 | Guerendel et al. | 181/102 |
| 4,901,289 | 2/1990 | Cretin et al. | 367/34 |
| 5,016,727 | 5/1991 | Wittrisch | 166/250.16 X |
| 5,111,880 | 5/1992 | Wittrisch et al. | 166/66 X |
| 5,111,903 | 5/1992 | Meynier | 181/102 |
| 5,181,565 | 1/1993 | Czernichow | 166/66 |
| 5,243,562 | 9/1993 | Laurent et al. | 367/25 |
| 5,363,094 | 11/1994 | Staron et al. | 340/854.6 |
| 5,636,686 | 6/1997 | Wittrisch | 166/66 |

FOREIGN PATENT DOCUMENTS

0 165 154  12/1985  European Pat. Off. .
0 291 005  11/1988  European Pat. Off. .

*Primary Examiner*—David J. Bagnell
*Attorney, Agent, or Firm*—Antonelli, Terry, Stout & Kraus, LLP

[57] ABSTRACT

The invention relates to a device for exploring an underground formation crossed by a well inclined significantly to the vertical. It comprises a plurality of rigid exploration modules (Mi) interconnected end to end, each module including a tube (1), a sonde placed inside the tube, containing one or more sensors and provided with an anchor arm, a guide for guiding the sonde radially between a position of rest and an eccentric working position where it can be pressed against the wall of the well through openings provided in the wall of each tube when it is shifted by opening of the arm, an acoustic decoupler between the sonde and the guide, a transmission system including multiconductor linking cables connecting the various sondes together and connected to a surface central station (40) by a connecting block (26) comprising a deferred electric connection under humid conditions and of an acquisition and transmission system, and a rigid string connected to a surface operating device for driving the exploration assembly into the portion. The invention can be used for seismic prospecting.

25 Claims, 3 Drawing Sheets

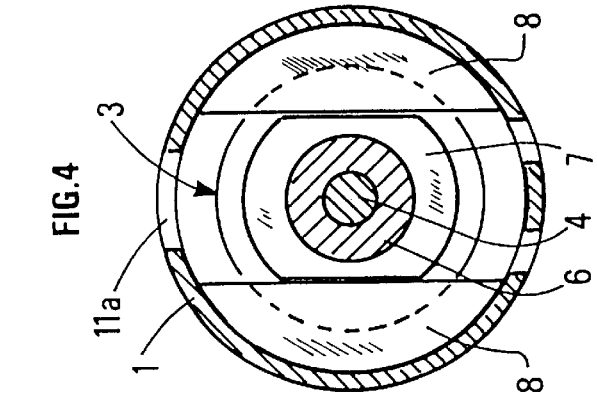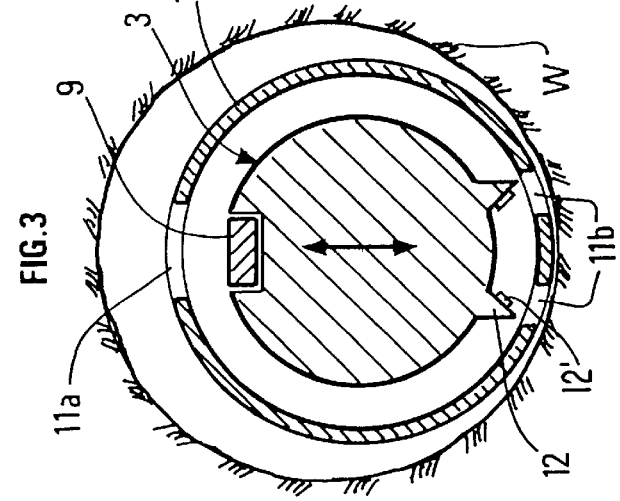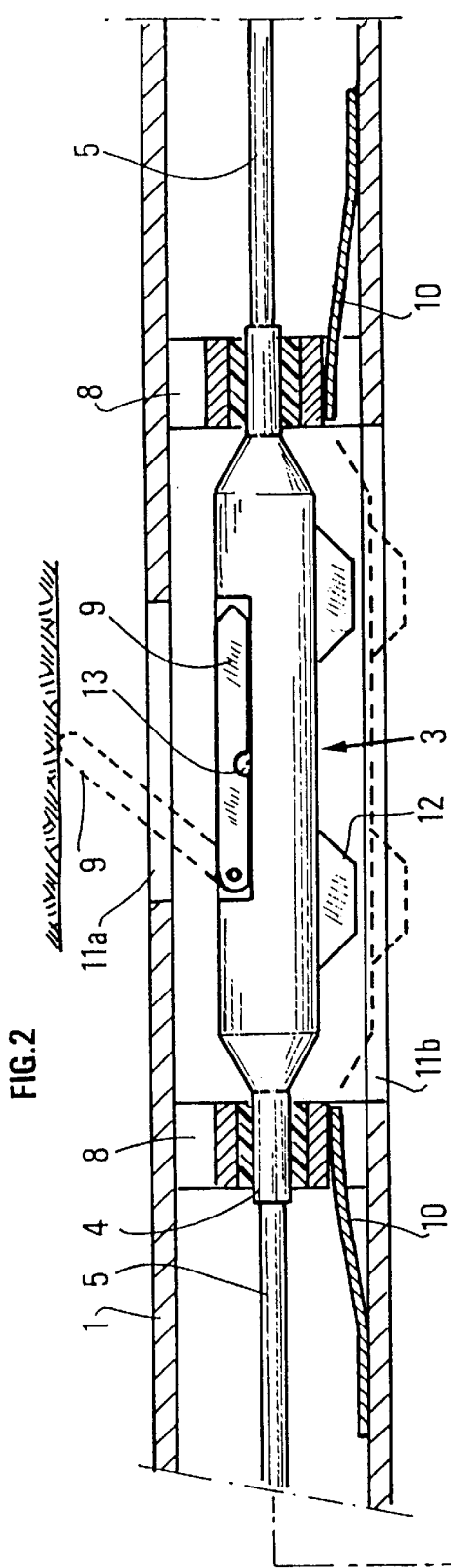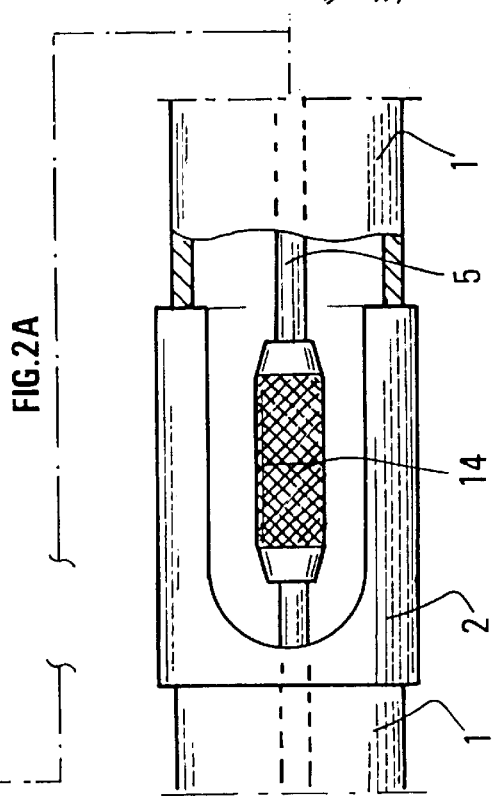

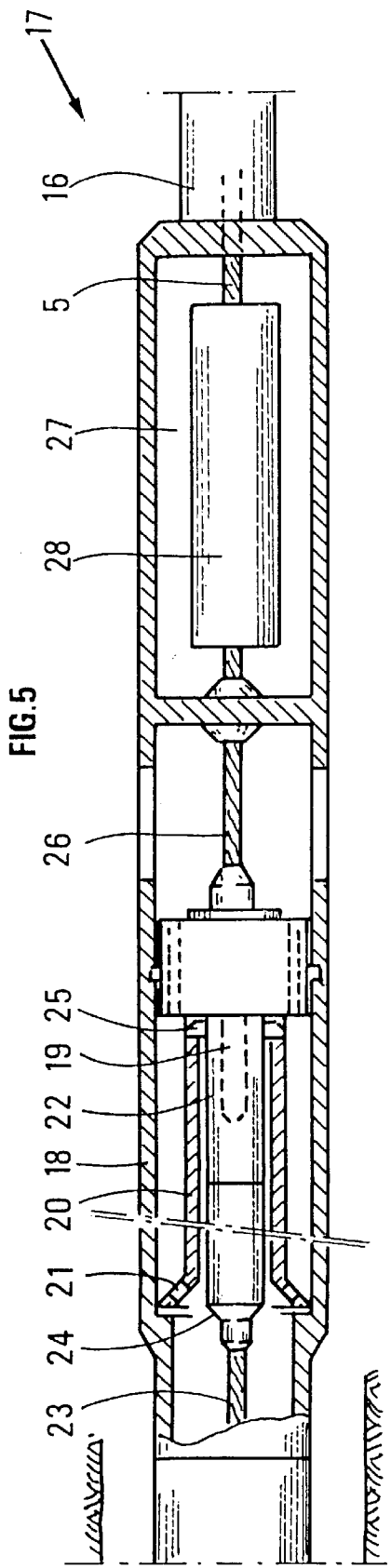

DEVICE FOR EXPLORING AN UNDERGROUND FORMATION CROSSED BY A HORIZONTAL WELL COMPRISING SEVERAL ANCHORABLE SONDES

BACKGROUND OF THE INVENTION

1. Field of the Invention

The present invention relates to a device for exploring an underground formation crossed by a well, suited to work in well portions where the advance thereof under the effect of gravity is difficult, notably in horizontal well portions or well portions substantially inclined to the vertical.

2. Description of the Prior Art

According to a well-known technique, seismic exploration of a geologic formation is performed by placing a receiving and/or transmitting set in one or more wells drilled through the formation in order to pick up signals reflected by subsoil discontinuities in response to seismic or acoustic waves emitted in a well or at the ground surface.

The seismic equipments can be used in vertical portions or in sufficiently vertical portions of the wells and, in this case, they are lowered therein through the effect of gravity.

The seismic equipments are for example placed in a well tool or in several well tools arranged in series along an electrocarrying cable, as described for example in the Assignee's French Patents 2,501,380 (U.S. Pat. No. 4,428,422), 2,616,230 (U.S. Pat. No. 4,901,289), and 2,636,741.

The Assignee's French Patents 2,656,034 (U.S. Pat. No. 5,181,565) and 2,674,029 (U.S. Pat. No. 5,243,562) describe a method of seismic prospecting of a geologic formation comprising using a reception device including one or more reception units that are set in a vertical well by means of a production string. The units are driven to the setting depth thereof and press against the wall of the well or against a casing pipe. Coupling can be achieved by shoes or arms that can be driven away from the string under the action of springs. These units can also be placed in boxes that are driven away from the string and mechanically decoupled therefrom.

The Assignee's French Patent 2,703,470 (U.S. Pat. No. 219,268) describes a process for setting, in one or more wells crossing an underground zone, a seismic or acoustic wave transmission-reception device comprising for example transmitting-receiving transducers that can be placed behind a tubular string used for other purposes and connected, permanently or not, to a surface control and recording station by means of cables. Such an assembly allows for example to perform P-wave or S-wave loggings of the layers surrounding each well and therefore a long-lasting monitoring of a reservoir.

The Assignee's French Patent 2,655,373 (U.S. 5,111,880) describes a system for driving a non rigid exploration device including several sondes connected together by electrocarrying cable portions into a well where the advance thereof under the effect of gravity is hindered notably because of the inclination of the well to the vertical. This device is guided towards a deflected well zone by means of a tubular string of pipes. A deferred electric connection device is used to connect the array of sondes to a cable connected to a surface control and recording station. A fluid current is established in the string in order to push the first sonde out of the string and to allow opening of the anchor arm. A traction exerted on the string allows the array of sondes to be taken out of the well and measurement cycles are conducted.

French patent application 95/12,265 describes a device for exploring an underground formation crossed by a well, suited to work in well portions where the advance thereof under the effect of gravity is difficult, notably in horizontal well portions or portions greatly inclined to the vertical. It includes a plurality of rigid exploration modules interconnected end to end, comprising each a tubular element or rigid pipe provided with a flexible plate for pressing against the wall of the well a box containing sensitive elements, a linking cable connected to a surface central station, and a connection block including an acquisition system connected to the various modules by a bundle of electric conductors running through the tubular elements, and a deferred electric connection under humid conditions between the linking cable and the acquisition system, this connection block being interposed between the array of exploration modules and a rigid string connected to surface operating device for driving the exploration assembly into the well portion selected.

SUMMARY OF THE INVENTION

The device according to the invention allows exploration of an underground formation crossed by a well comprising well portions where the advance thereof under the effect of gravity is difficult, notably horizontal well portions or portions substantially inclined to the vertical. The invention is notably suited for subsurface seismic prospecting operations.

The device comprises a plurality of exploration modules interconnected end to end with each module including a rigid tube whose wall is provided with elongate openings, an elongate sonde comprising one or more sensors, placed inside the rigid tube, a guide for guiding the sonde radially between a position of rest and an eccentric working position where it is pressed against the wall of the well, an acoustic decoupler between the sonde and the rigid tube, each sonde being provided with at least one anchor arm that can be shifted between a closed position and an open position where the sonde is in working position, and an actuator for actuating opening of the anchor arm, the device comprising a string for shifting the whole of the exploration modules in the well and a connection connecting the various sondes to a surface station.

The device can comprise a return for driving the sonde back into its position of rest, having for example springs and optionally an element secured to the rigid tube that co-operates with the anchor arm.

The guide includes for example guide pieces associated with the sonde at the ends thereof, guide bars for the guide pieces, and the decoupler comprises for example blocks made from a damping material interposed between the sonde and the guide pieces.

The sensors can be positioned in the sonde bodies or in anchor shoes at the end of the anchor arms.

The device includes, for example, a common electromechanical connection assembly connecting the various sondes together and to a surface station. This common electromechanical connection can include a connecting block comprising a collection system connected to the various modules by a common multi-conductor cable running through each sonde, whose conductors are connected to the sensors in order to centralize the signals coming therefrom, and a deferred electric connection block under humid conditions between a linking cable connected to the surface station and the collection system, this connecting block being interposed between the array of exploration modules and said string.

According to an embodiment, the deferred electric connection block includes a multi-contact plug, a tubular extension for guidance in the connecting block, a multi-contact socket connected to the multi-conductor cable and a lock for locking the socket in an engaging position.

The device can also comprise a tubular head element including an unbalanced mass and an orientation indicator for determining the angular positioning of the whole of the exploration modules with respect to the vertical.

The string preferably comprises a special side-entry sub allowing passage of the linking cable.

The device according to the invention is advantageous in that:

it can be made by interconnecting end to end a variable number of standard exploration modules associated, by a connecting block, with a string of pipes that is sufficiently lengthened to be pushed down into a well portion that is either very inclined or so shaped that it prevents free lowering of the modules, the various sondes in position of rest are protected against possible impacts by the various tubes during all the phases of displacement of the device in the well and, without it being necessary to remove them, they can be readily pressed against the wall of the well so as to couple the sensors with the formations surrounding the well.

BRIEF DESCRIPTION OF THE DRAWINGS

Other features and advantages of the device according to the invention will be clear from reading the description hereafter of embodiments given by way of non limitative examples, with reference to the accompanying drawings in which.

DESCRIPTION OF THE INVENTION

Figure 1:
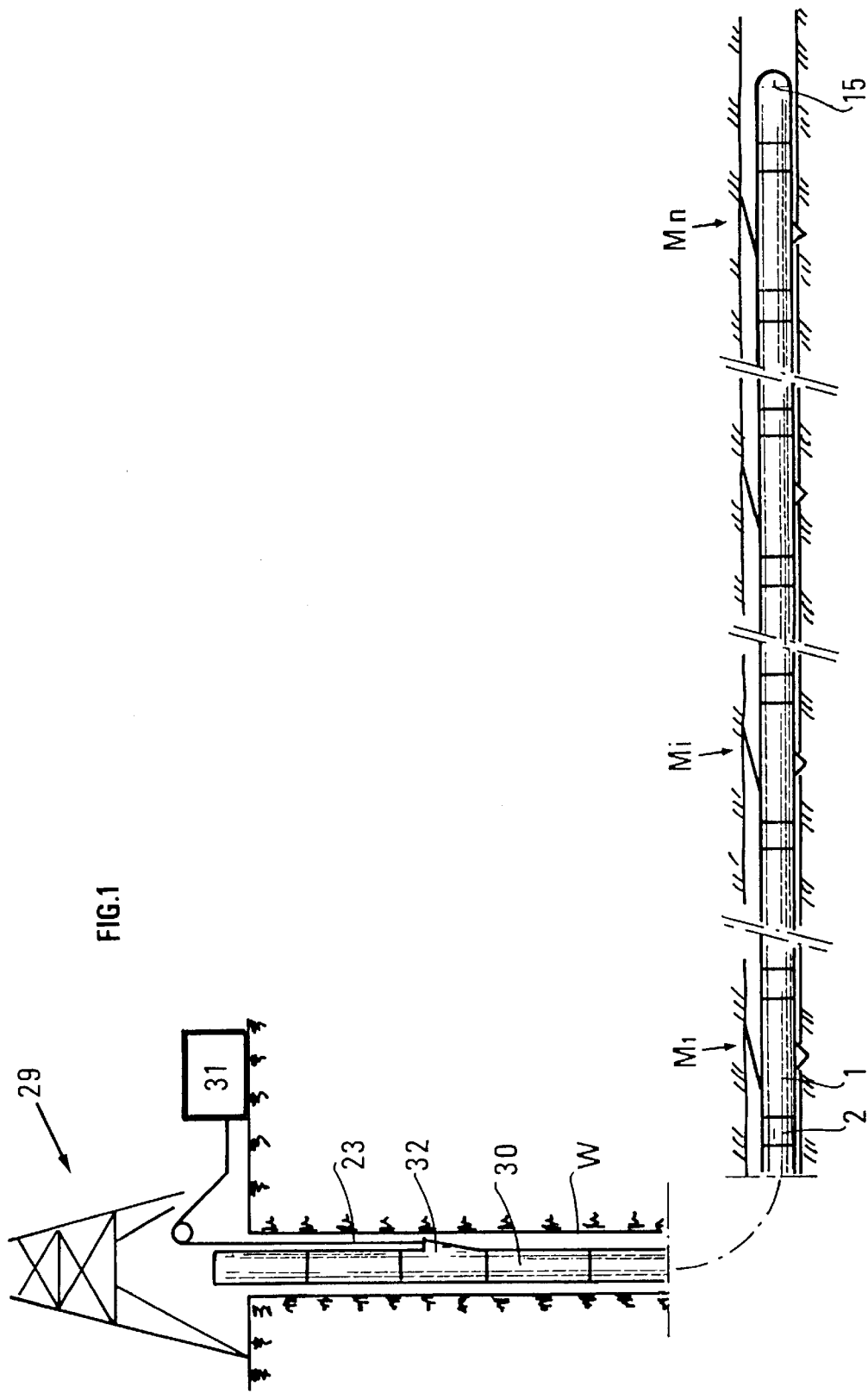
FIG. 1 diagrammatically shows the whole of the device according to a first embodiment, set in a well part of which is horizontal, FIG. 2 diagrammatically shows a sectional view of the layout of each exploration module, FIG. 3 diagrammatically shows a cross-sectional view of a sonde in its protective tube, FIG. 4 diagrammatically shows a guide element for guiding each sonde in lateral displacement, and FIG. 5 diagrammatically shows a sectional view of a block connecting all of the exploration modules to a string of pipes extending up to the surface.

The device has (FIGS. 1, 2) an array of modules Ml, Mi, Mi+1, . . . , Mn interconnected end to end, suited to be lowered into a well W having horizontal portions or portions substantially inclined to the vertical. Each one of these modules Mi includes a rigid tube 1 ended at the two opposite ends thereof by a fastening piece 2 in order to be connected (by screwing on for example) to the end of an adjacent tube 1.

A sonde 3 provided with housings for one or more boxes of sensitive elements (not shown) is placed inside each rigid tube 1. These boxes can be fixed with respect to the body of the sonde or they can be elastically decoupled therefrom, as described in French Patent 2,561,394 (U.S. Pat. No. 4,874, 060). At each end thereof, sonde 3 is fitted with a seal piece 4 through which runs a portion of a multi-conductor cable 5 of a type commonly used for data transmission in wells. Each piece 4 is surrounded by a ring 6 made from a damping material such as an elastomer, and this ring is housed in a supporting piece 7 suited to move in a guide bar 8 secured to the rigid tube.

This sonde comprises an anchor arm 9 that can be shifted between a closed position where it rests against the body of sonde 3 and an open position (in dotted line in FIG. 2) where it is coupled with the wall of well W by a motive device (not shown).

An elastic element 10 such as spring plates is interposed between each damping ring 6 and tube 1 so as to bring sonde 3 back to a central position of rest.

An elongate opening 11a is provided in the rigid tube 1, in the diametrical plane containing the axis of guide bar 8, to allow the spreading of arm 9. Symmetrically to this plane, on the side opposite arm 9 (FIG. 3), sonde 3 is provided with coupling shoes 12. Openings 11b are provided in the wall of the rigid tube 1 so that these shoes 12 can rest against the wall of the well when the sonde is pushed into an anchoring position (in dotted line in FIG. 2) as arm 9 opens. Shoes 12 may contain sensors 12' as illustrated in FIG. 3.

A pipe 13 forming a stop is fastened transversely in tube 1, in such a position that the arm rests against it when it closes in case return springs 10 are inadequate to bring sonde 3 back to its position of rest (because of too tight a coupling between the sonde and the wall of the well).

A multi-pin connector 14 (FIG. 2A) is placed inside each fastening piece 2. The various lines of multi-conductor cable 5 are welded to the pins of the connector 14. The lines allow transmission of the signals picked up by the receivers in the body of the sonde.

A connection system similar to that described in the Assignee's European Patent 290,338 can for example be used to establish this interconnection, both mechanical and electric, of the various modules.

The whole of the modules interconnected end to end is associated (FIG. 1), at a first end, with a tubular head element 15 provided with an unbalanced mass and with an orientation indicator (not shown) intended to determine the orientation of the unbalanced mass with respect to the vertical plane. An indicator of a well-known type comprising a pendular weight in contact with a potentiometer track can for example be used, this indicator being connected to a line of multi-conductor cable 5.

A connection system similar to that described in the Assignee's European Patent 290,338 can for example be used to establish this interconnection, both mechanical and electric, of the various modules.

At the opposite end of the array of modules, tubular element Ml is connected by a pipe 16 to a connecting block 17 provided with a deferred electric connection under damp conditions. Block 17 comprises (FIG. 5) a tubular body 18, a multi-contact plug 19 oriented along the axis of body 18, in the center of a tubular guide extension 20 whose section is smaller than that of the body and ended by a flange 21. This extension 20 serves to guide a multi-contact socket 22 that is connected to the various conductors of a multi-conductor cable 23 and suited to fit onto plug 19. Socket 22 is topped by a tubular weighting bar 24. Locks 25 that can be remote-controlled from the surface allow the socket to be locked in a position of plugging onto plug 19.

A cable 26 connects multi-contact socket 19 to a sealed compartment 27 of the tubular body 17 containing a collection and transmission system 28 as described for example in the Assignee's French Patent 2,688,896 ("permanent sensor ranging"). Connecting block 17 is connected to surface operating means 29 by means of a string of pipes 30.

System 28 receives the signals transmitted thereto through the various lines of multi-conductor cable 5. It digitizes them and codes them in order to be transmitted by cable 23 to a surface central control and recording station 31.

According to a layout notably described in the Assignee's French Patent 2,547,861 (U.S. Pat. No. 4,664,289), connection between the multi-conductor cable 23 and the central station 31 is facilitated by using a special side-entry sub 32 allowing, once it is in place, changing of the length of the drill of pipes 30 without it being necessary to interrupt the conducting links.

An exploration assembly comprising twelve tubular elements 1 having a length of multiples of ten meters, made of steel, aluminium or glass fiber, associated each with a "triphone", and containing for example an electric connector 14 with 61 pins also allowing electric connection of the orientation indicator in head element 15, can for example be used.

Operation:

Setting the array of exploration modules Ml to Mn in a zone of a well where operations are planned is performed as follows:

The tubular head element 15 is introduced into the well, as well as, by successive interconnections end to end, the various exploration modules Ml to Mn, the pipe 16, the connecting block 17 and possibly a certain number of sections of the string of pipes 30. The special side-entry sub 32 into which the multi-contact socket 22 topped by its weighting bar 24 is inserted is fastened thereafter. A swivel (not shown) is thereafter associated with the string of pipes 30 in order to pump multi-contact socket 22 until it fits onto the plug 19 of connecting block 17.

A sufficient number of sections is then added to the string of pipes 30 so as to drive the whole of the exploration modules Ml–Mn into the zone of the well where exploration operations are to be performed. By monitoring, from surface station 31, the indications of the orientation detector in the head element 15 provided with a weighting mass and by rotating sufficiently the string of pipes 30 during the advance thereof, the various exploration modules Ml to Mn can be so oriented that the anchor arms are in the same swivelling plane, the vertical plane for example, and therefore that the various sensors are coupled with the wall of the well substantially with a common alignment. Opening of the arms 9 of the various modules is then remote-controlled by action on the motive means from the surface station in order to couple the sondes with the formations surrounding the well.

A seismic source can for example be placed on the surface or in another well, seismic pick-ups are placed in the sondes of the various exploration modules Ml–Mn, and transmission-reception cycles can be carried out while the signals collected by acquisition set 28 and transmitted through cable 23 are recorded at the surface station 31.

The whole of the modules can be shifted at will by adding (or by removing) additional sections to the string of pipes 30 so as to explore the formation over a greater well length and to perform multiple coverages.

As described in the above-mentioned French Patents 2,613,159, 2,613,496, 2,616,230, the sensors in the various exploration modules Ml–Mn can be associated with local electronic circuits with more or less extended functions. The circuits in question may be local amplifying and filtering analog circuits, acquisition, digitizing and coded transmission being provided by system 28 in the connecting block. Each sonde can comprise local acquisition and digitizing circuits if this is justified by the number n of interconnected modules. The digitized data coming from the various exploration modules Ml–Mn are then collected by system 28 in connecting block 17, where they are coded and transmitted to surface station 31.

Tubular elements 1 provided, according to a well-known technique, with slots intended to reduce the propagation velocity of the waves along the array of modules can be used without departing from the scope of the invention.

An additional section comprising a source of acoustic or seismic waves can also be associated with the array of exploration modules Ml–Mn, or transmitting-receiving transducers can be placed in the various sondes without departing from the scope of the invention.

I claim:

1. A device for exploring an underground formation crossed by a well, in portions of the well where an advance thereof is not exclusively under an effect of gravity comprising a plurality of exploration modules interconnected end to end, wherein each module comprises a rigid tube having a wall provided with elongate openings, an elongate sonde comprising at least one sensor, each sensor being placed inside the rigid tube, a guide for guiding the sonde radially between a position of rest and a working position where each sonde is pressed against a wall of the well, an acoustic decoupler between each sonde and the rigid tube, each sonde being provided with at least one anchor arm which is positionable in a closed position and an open position where the sonde is in the working position, and an actuator for actuating opening each anchor arm, a string for moving the plurality of exploration modules in the well and a connection coupled to each sonde for connecting each sonde to a surface station.

2. A device as claimed in claim 1, further comprising a return for bringing each sonde back to the rest position.

3. A device as claimed in claim 2, wherein the guide includes guide pieces associated with each sonde at the ends thereof, guide bars for the guide pieces, and the acoustic decoupler includes blocks made of a damping material interposed between each sonde and the guide pieces.

4. A device as claimed in claim 3, wherein the return of each sonde comprises an element secured to the rigid tube that cooperates with the at least one anchor arm.

5. A device as claimed in claim 4, wherein sensors are placed in a body of each sonde.

6. A device as claimed in claim 4, wherein sensors are placed in anchor shoes associated with each anchor arm.

7. A device as claimed in claim 3, wherein sensors are placed in anchor shoes associated with each anchor arm.

8. A device as claimed in claim 2, wherein the return of each sonde comprises an element secured to the rigid tube that cooperates with the at least one anchor arm.

9. A device as claimed in claim 8, wherein sensors are placed in a body of each sonde.

10. A device as claimed in claim 8, wherein sensors are placed in anchor shoes associated with each anchor arm.

11. A device as claimed in claim 2, wherein sensors are placed in a body of each sonde.

12. A device as claimed in claim 11, wherein sensors are placed in anchor shoes associated with each anchor arm.

13. A device as claimed in claim 2, wherein sensors are placed in anchor shoes associated with each anchor arm.

14. A device as claimed in claim 1, wherein the guide includes guide pieces associated with each sonde at the ends thereof, guide bars for the guide pieces, and the acoustic decoupler includes blocks made of a damping material interposed between each sonde and the guide pieces.

15. A device as claimed in claim 14, wherein sensors are placed in a body of each sonde.

16. A device as claimed in claim 15, wherein sensors are placed in anchor shoes associated with each anchor arm.

17. A device as claimed in claim 14, wherein sensors are placed in anchor shoes associated with each anchor arm.

18. A device as claimed in claim 1, wherein sensors are placed in a body of each sonde.

19. A device as claimed in claim 18, wherein sensors are placed in anchor shoes associated with each anchor arm.

20. A device as claimed in claim 1, wherein sensors are placed in anchor shoes associated with each anchor arm.

21. A device as claimed in claim 1, wherein the connection of the sondes to a surface station includes a common electromechanical linking assembly connecting the sondes together.

22. A device as claimed in claim 21, wherein the common electromechanical linking assembly includes a connecting block comprising a collection system connected to the modules by a common multi-conductor cable running through each sonde, having lines connected to the at least one sensor in order to collect signals coming therefrom, and a deferred electric connection block under humid conditions between a linking cable connected to surface station and a collection system, the connection block being interposed between the plurality of exploration modules and the string.

23. A device as claimed in claim 22, wherein the deferred electric connection block comprises a multi-contact plug, a tubular extension for guiding a multi-contact socket connected to a multi-conductor cable in the connection block, and a lock for locking the multi-contact socket in an engaging position.

24. A device as claimed in claim 1 further comprising a tubular head element including an unbalanced weight and an orientation indicator for determining an angular positioning of the plurality of exploration modules with respect to the vertical.

25. A device as claimed in claim 1, wherein the tube comprises a side-entry sub allowing passage of a linking cable.

* * * * *